(12) United States Patent
Chen et al.

(10) Patent No.: US 12,607,873 B2
(45) Date of Patent: Apr. 21, 2026

(54) HEAD MOUNTED DISPLAY DEVICE

(71) Applicant: HTC Corporation, Taoyuan City (TW)

(72) Inventors: Sheng-Wen Chen, Taoyuan City (TW);
Wei-Cheng Hsu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 298 days.

(21) Appl. No.: 18/506,146

(22) Filed: Nov. 10, 2023

(65) Prior Publication Data

US 2024/0361612 A1 Oct. 31, 2024

Related U.S. Application Data

(60) Provisional application No. 63/461,602, filed on Apr. 25, 2023.

(51) Int. Cl.
| | |
|---|---|
| *G02C 5/22* | (2006.01) |
| *G02B 27/01* | (2006.01) |
| *G02C 5/20* | (2006.01) |

(52) U.S. Cl.
CPC .......... *G02C 5/22* (2013.01); *G02B 27/0176* (2013.01); *G02C 5/20* (2013.01); *G02B 2027/0178* (2013.01); *G02C 2200/06* (2013.01); *G02C 2200/18* (2013.01); *G02C 2200/24* (2013.01)

(58) Field of Classification Search
CPC ........ G02B 27/0176; G02B 2027/0178; G02C 5/22; G02C 5/20; G02C 2200/06; G02C 2200/18; G02C 2200/24
USPC ................................. 351/111–124, 140–153
See application file for complete search history.

(56) References Cited

U.S. PATENT DOCUMENTS

| | | | |
|---|---|---|---|
| 10,247,949 B2 | 4/2019 | Kartal et al. | |
| 2007/0279580 A1* | 12/2007 | Breda ................... | G02C 5/2263 |
| | | | 351/115 |
| 2016/0116761 A1* | 4/2016 | Sbardella ............. | G02C 5/2245 |
| | | | 351/153 |
| 2017/0131553 A1 | 5/2017 | Pletenetskyy et al. | |
| 2017/0307903 A1* | 10/2017 | Calilung ................. | G02C 5/10 |

FOREIGN PATENT DOCUMENTS

| | | | | |
|---|---|---|---|---|
| CN | 216526541 | 5/2022 | | |
| IT | 201800002892 A1 * | 8/2019 | .......... | G02C 5/2245 |
| TW | M356928 U * | 5/2009 | | |
| TW | 202037968 | 10/2020 | | |

OTHER PUBLICATIONS

"Office Action of Taiwan Counterpart Application", issued on May 8, 2024, p. 1-p. 5.

* cited by examiner

*Primary Examiner* — Mahidere S Sahle
(74) *Attorney, Agent, or Firm* — JCIPRNET

(57) ABSTRACT

A head mounted display device includes a host, two sliding parts, two locking parts and two brackets. The host has two connecting bases located on opposite sides of the host. The two sliding parts are respectively slidably connected to the corresponding connecting base. The two locking parts are respectively used to lock the corresponding sliding part in a retracted position or a pulled-out position relative to the corresponding connecting base. The two brackets are respectively pivotally connected to one end of the corresponding sliding part away from the host.

6 Claims, 6 Drawing Sheets

HEAD MOUNTED DISPLAY DEVICE

CROSS-REFERENCE TO RELATED APPLICATION

This application claims the priority benefit of U.S. provisional application Ser. No. 63/461,602, filed on Apr. 25, 2023. The entirety of the above-mentioned patent application is hereby incorporated by reference herein and made a part of this specification.

BACKGROUND

Technical Field

The application relates to a display device, and in particular, to a head mounted display device.

Description of Related Art

As the technology industry becomes increasingly developed, the types, functions and usage methods of display devices are becoming more and more diverse, and head-mounted display devices that can be worn directly on the user's head have also emerged accordingly. There are many types of the head mounted display device. Take the head mounted display device of glasses type as an example, after the user wears this type of display device, in addition to seeing a three-dimensional image, the image will also change as the user's head rotates. Therefore, it can provide users with a more immersive experience.

However, each user's head size is different. Therefore, it is necessary for the head mounted display device to provide an adjustable structure to suit different users to improve wearing comfort and prevent the head mounted display device from being damaged due to falling.

SUMMARY

The present application provides a head mounted display device, which provides an adjustable structure to suit different users.

The head mounted display device of the application includes a host, two sliding parts, two locking parts and two brackets. The host has two connecting bases located on opposite sides of the host. The two sliding parts are respectively slidably connected to the corresponding connecting base. The two locking parts are respectively used to lock the corresponding sliding part in a retracted position or a pulled-out position relative to the corresponding connecting base. The two brackets are respectively pivotally connected to one end of the corresponding sliding part away from the host.

Based on above, in the head mounted display device of the application, the distance between the bracket and the host can be adjusted, making it suitable for users with different head sizes.

DESCRIPTION OF THE EMBODIMENTS

Figure 1:
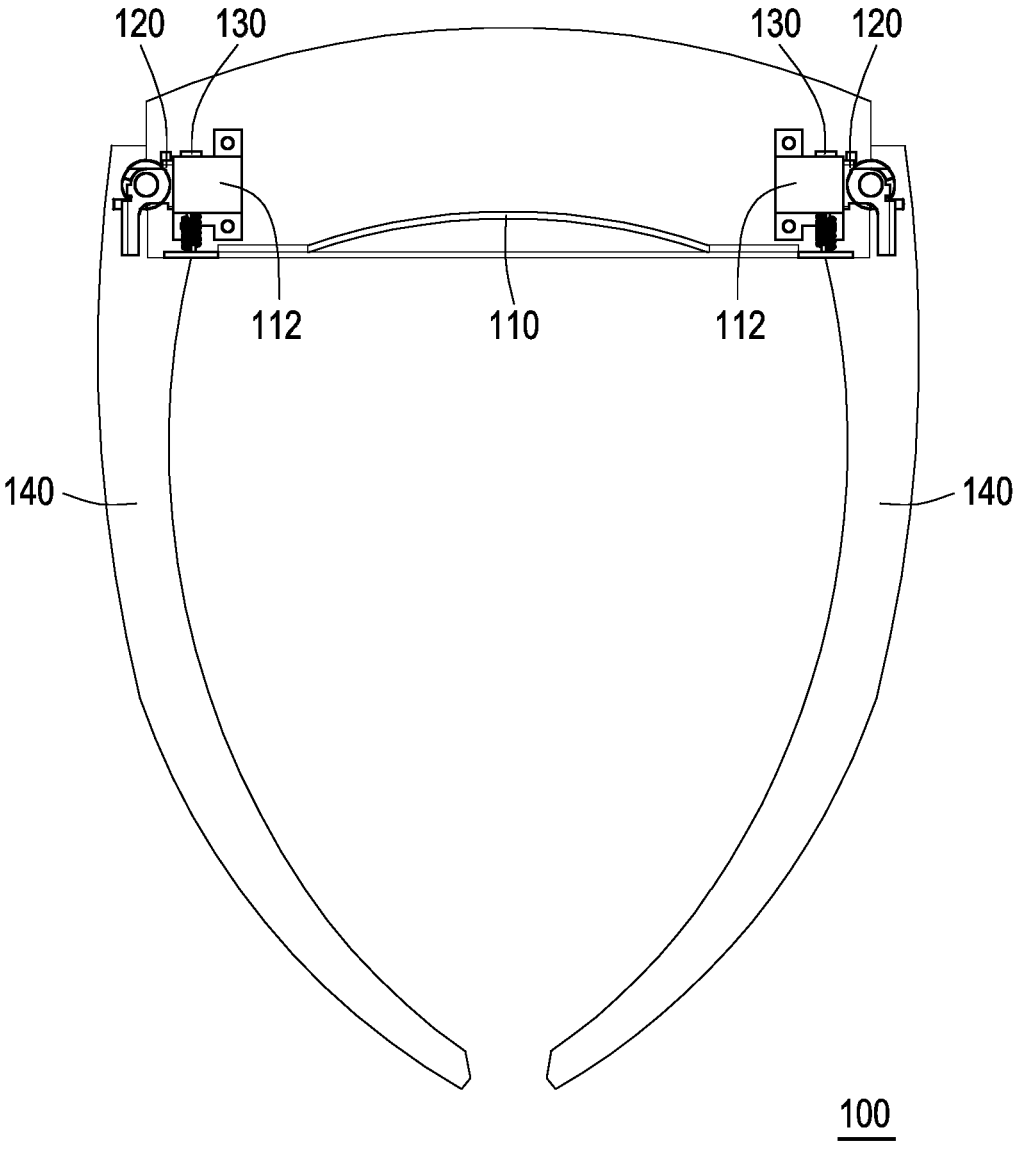
FIG. 1 is a schematic diagram of a head mounted display device according to an embodiment of the present application.
Figure 2:
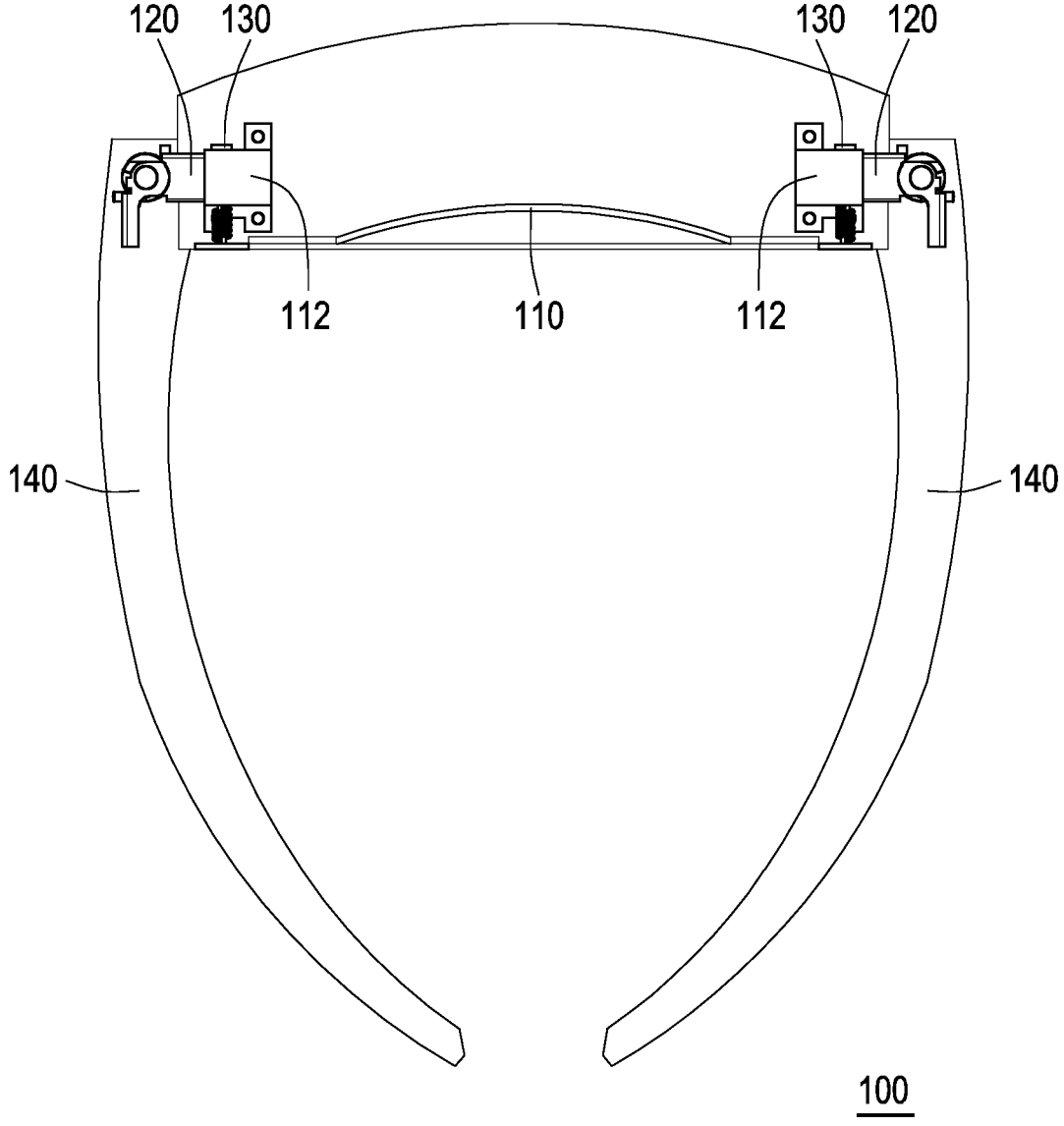
FIG. 2 is a schematic diagram of the head mounted display device of FIG. 1 after its brackets are pulled out.

FIG. 1 is a schematic diagram of a head mounted display device according to an embodiment of the present application. FIG. 2 is a schematic diagram of the head mounted display device of FIG. 1 after its brackets are pulled out. Referring to FIG. 1 and FIG. 2, the head mounted display device 100 of the embodiment includes a host 110, two sliding parts 120, two locking parts 130 and two brackets 140. The host 110 has two connecting bases 112 located on opposite sides of the host 110. The two sliding parts 120 are respectively slidably connected to the corresponding connecting base 112. The two brackets 140 are respectively pivotally connected to one end of the corresponding sliding part 120 away from the host 110. In the embodiment, the brackets 140 may be temples to facilitate holding the user's head.

In FIG. 1, the sliding parts 120 are in a retracted position relative to the connecting bases 112. Therefore, one end of the sliding parts 120 away from a main body is closer to the main body, which also makes the brackets 140 pivotally connected to one end of the sliding parts 120 away from the host 110 also closer to the main body. That is, the distance between the two brackets 140 on both sides of the host 110 is relatively close. At this time, the head mounted display device 100 is suitable to be worn on the head of a user with a smaller head size, and is not easy to loosen. After the user determines that the sliding parts 120 in the retracted position is suitable for him or her, the locking parts 130 can be used to lock the sliding parts 120 in the retracted position.

In FIG. 2, the sliding parts 120 are in a pulled-out position relative to the connecting bases 112. Therefore, one end of the sliding parts 120 away from the main body is farther away from the main body, which also makes the brackets 140 pivotally connected to one end of the sliding parts 120 away from the host 110 also far away from the main body. That is, the distance between the two brackets 140 on both sides of the host 110 is relatively far. At this time, the head mounted display device 100 is suitable to be worn on the head of a user with a bigger head size and does not exert too much clamping force on the user's head, which provides a comfortable wearing feel. After the user determines that the sliding parts 120 in the pulled-out position is suitable for him or her, the locking parts 130 can be used to lock the sliding parts 120 in the pulled-out position.

Figure 3:
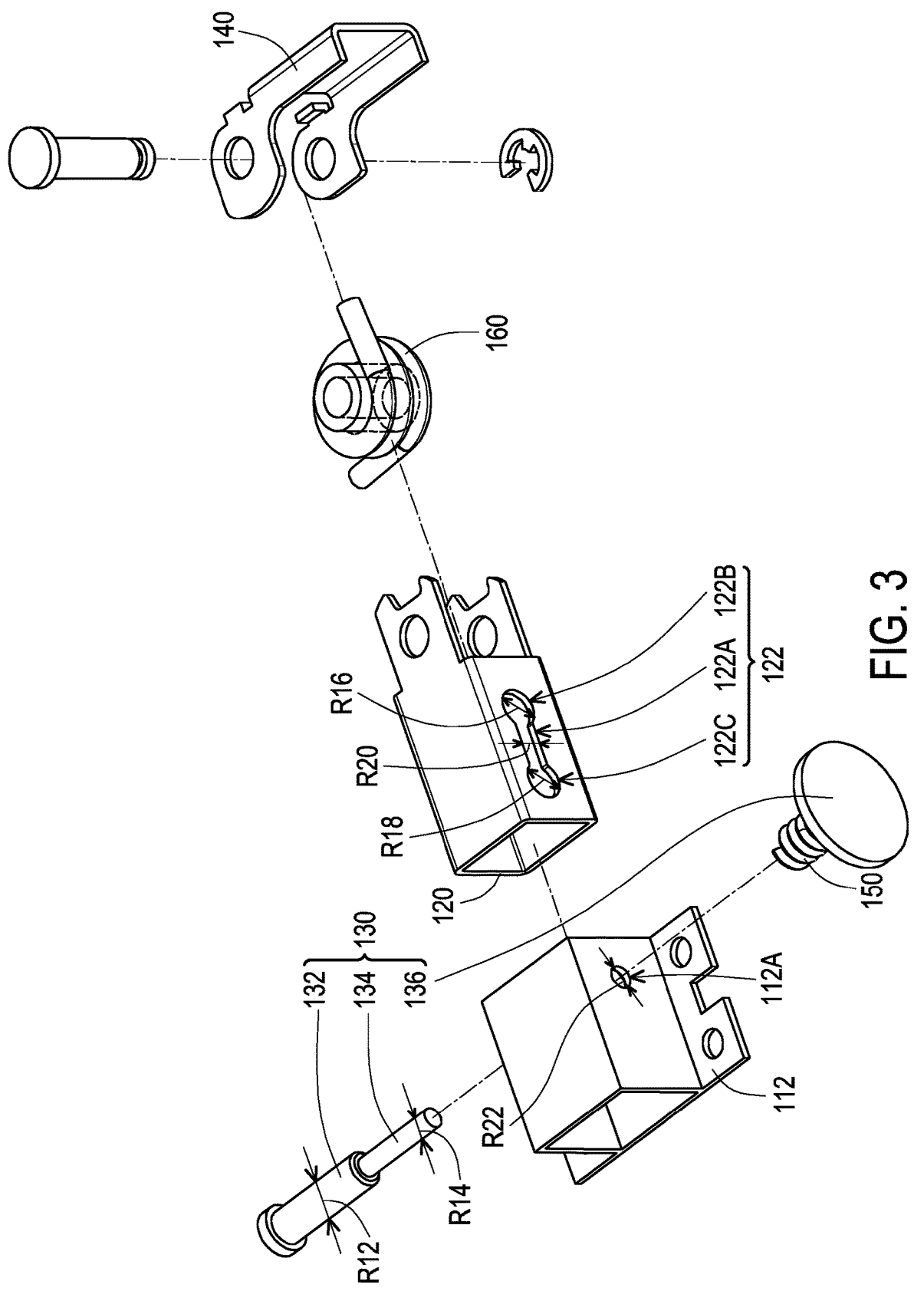
FIG. 3 is an exploded diagram of the head mounted display device of FIG. 1 at the assembly point of the bracket and the host.
Figure 4:
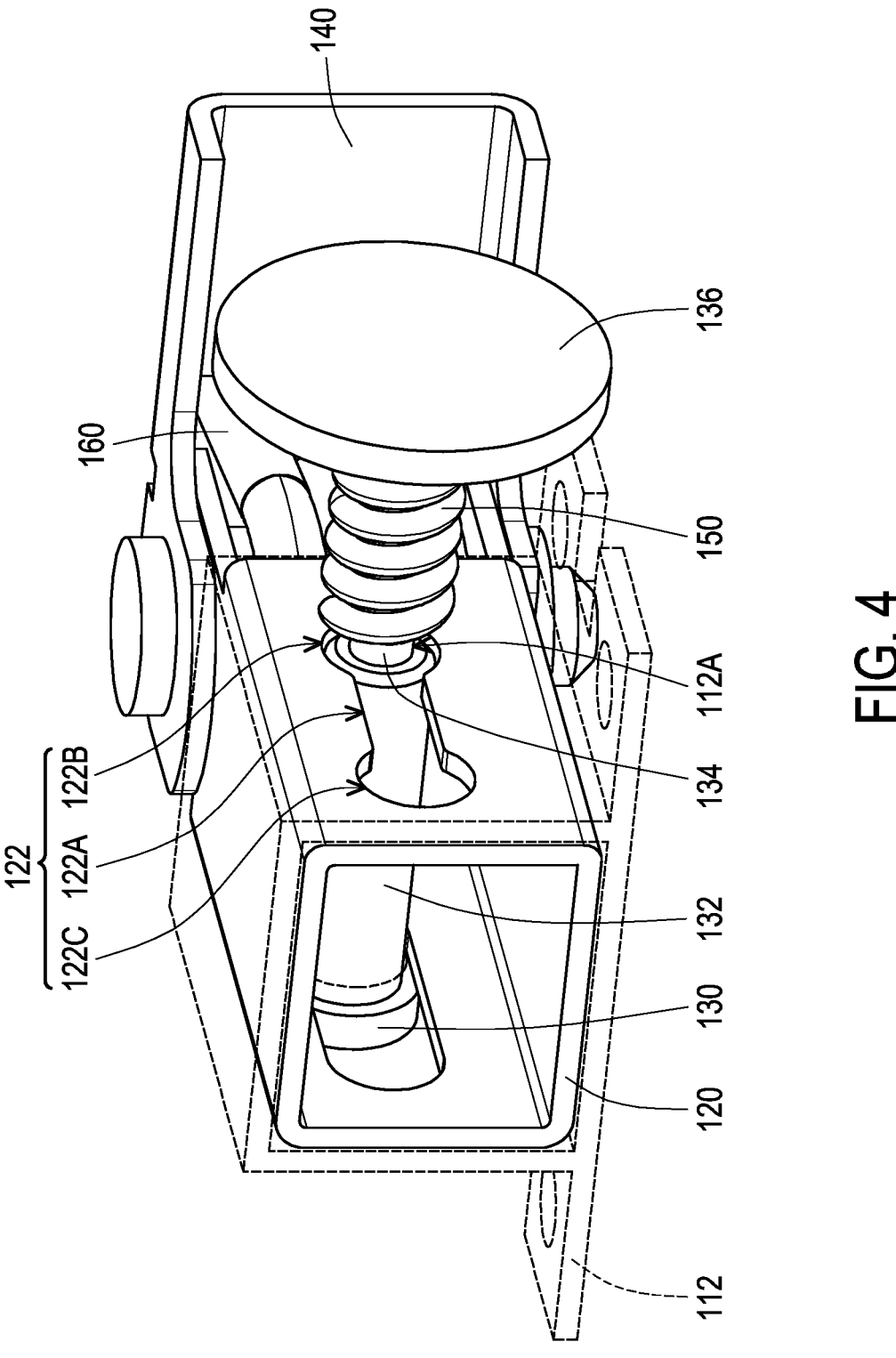
FIG. 4 is a partial schematic diagram of the sliding part of the head mounted display device of FIG. 1 locked in the retracted position.

FIG. 3 is an exploded diagram of the head mounted display device of FIG. 1 at the assembly point of the bracket and the host. FIG. 4 is a partial schematic diagram of the sliding part of the head mounted display device of FIG. 1 locked in the retracted position. Referring to FIG. 3 and FIG. 4, in the embodiment, each of the connecting bases 112 has a hole 112A. Each of the locking parts 130 has a first segment 132 and a second segment 134 connected to each other. A rod diameter R12 of the first segment 132 of each of the locking parts is larger than a rod diameter of R14 of the second segment 134. A hole diameter R22 of each of the holes 112A is smaller than the rod diameter R12 of each of the first segments 132 and greater than or equal to the rod diameter R14 of each of the second segments 134. Therefore, only the second segment 134 of the locking part 130 can pass through the corresponding hole 112A. The hole 112A may serve to fix the position of the locking part 130 relative to the connecting base 112, but allows the second segment 134 of the locking part 130 to slide within the hole 112A.

Each of the sliding parts 120 has a slot 122. Each of the slots 122 has a connecting section 122A and a first end 122B and a second end 122C located at both ends of the connecting section 122A. A hole diameter R16 of each of the first ends 122B and a hole diameter R18 of each of the second ends 122C are greater than or equal to the rod diameter R12 of each of the first segments 132. A width R20 of each of the connecting sections 122A is less than the rod diameter R12 of each of the first segments 132 and greater than or equal to the rod diameter R14 of each of the second segments 134. Therefore, the first segment 132 of the locking part 130 can only pass through the first end 122B and the second end 122C of the slot 122, but the first segment 132 of the locking part 130 cannot pass through the connecting section 122A of the slot 122. Since the second segment 134 of the locking part 130 can pass through the connecting section 122A, the first end 122B and the second end 122C of the slot 122, the second segment 134 of the locking part 130 can move between the first end 122B and the second end 122C through the connecting section 122A.

When the locking part 130 slides along its length direction so that the second segment 134 is located in the slot 122, the sliding part 120 can slide relative to the connecting base 112. When the locking part 130 slides along its length direction so that the first segment 132 is located in the first end 122B or the second end 122C of the slot 122, since the first segment 132 cannot enter the connecting section 122A, the sliding part 120 cannot slide relative to the connecting base 112. That is to say, the locking part 130 can lock the relative positions of the sliding part 120 and the connecting base 112.

In FIG. 4, the first segment 132 of the locking part 130 is located at the first end 122B, that is, the locking part 130 locks the sliding part 120 in the retracted position. Therefore, in the state shown in FIG. 1, the state of the head mounted display device 100 where the bracket 140 and the host 110 are assembled is as shown in FIG. 4.

Figure 5:
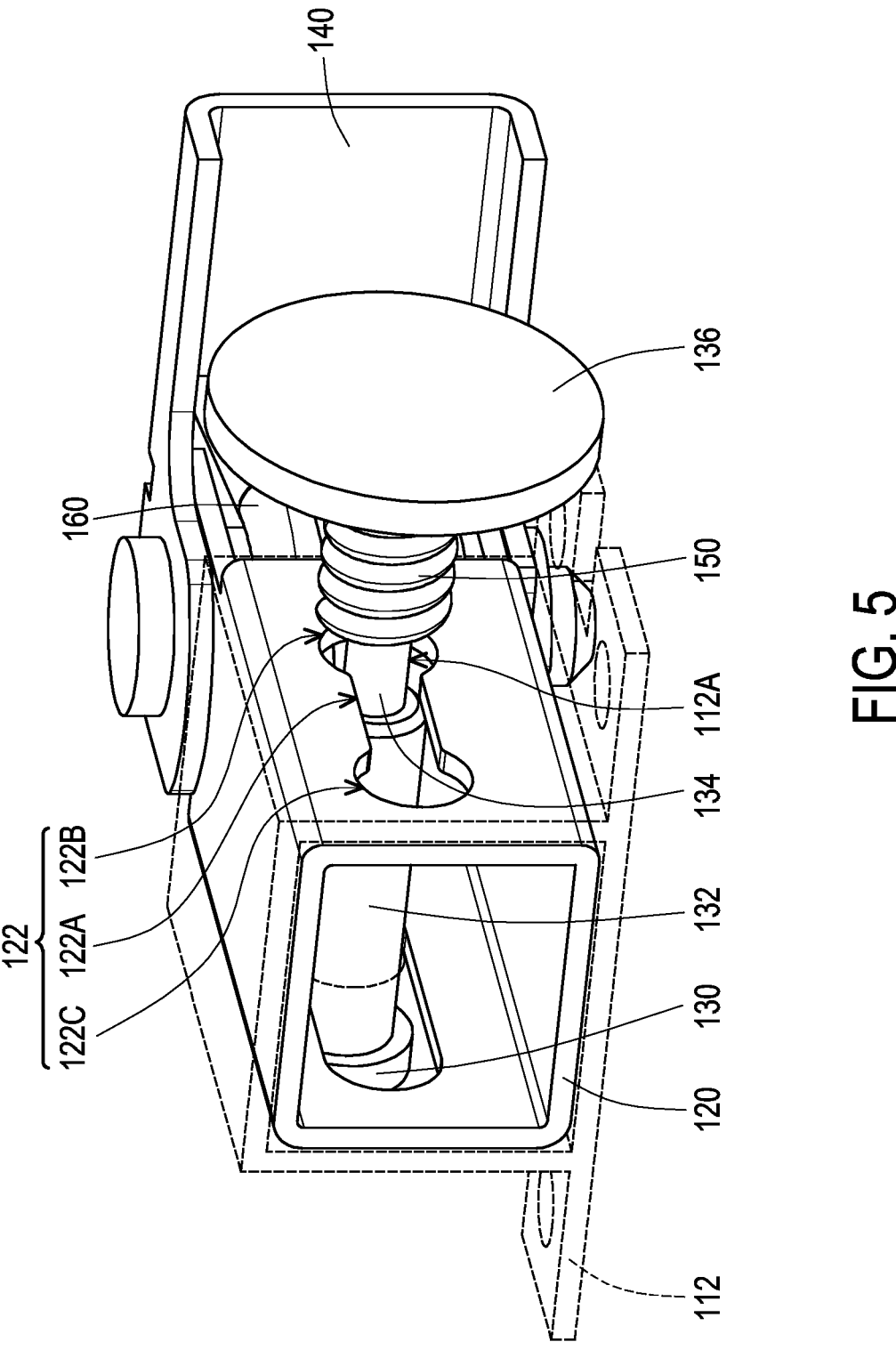
FIG. 5 is a partial schematic diagram of the locking part of the head mounted display device of FIG. 1 when it is unlocked.

FIG. 5 is a partial schematic diagram of the locking part of the head mounted display device of FIG. 1 when it is unlocked. Referring to FIG. 5, the locking part 130 slides along its length direction to cause the first segment 132 to exit the first end 122B of the slot 122, and the second segment 134 to enter the slot 122. At this time, the sliding part 120 can slide relative to the connecting base 112. In the embodiment, each of the locking parts 130 further has a pressing part 136, which is located at one end of the second segment 134 away from the first segment 132. The pressing part 136 and the first segment 132 are respectively located at both sides of the corresponding hole 112A. Therefore, the user can press the pressing part 136 to push the locking part 130 to slide along its length direction, so that the first segment 132 exits the first end 122B of the slot 122.

Figure 6:
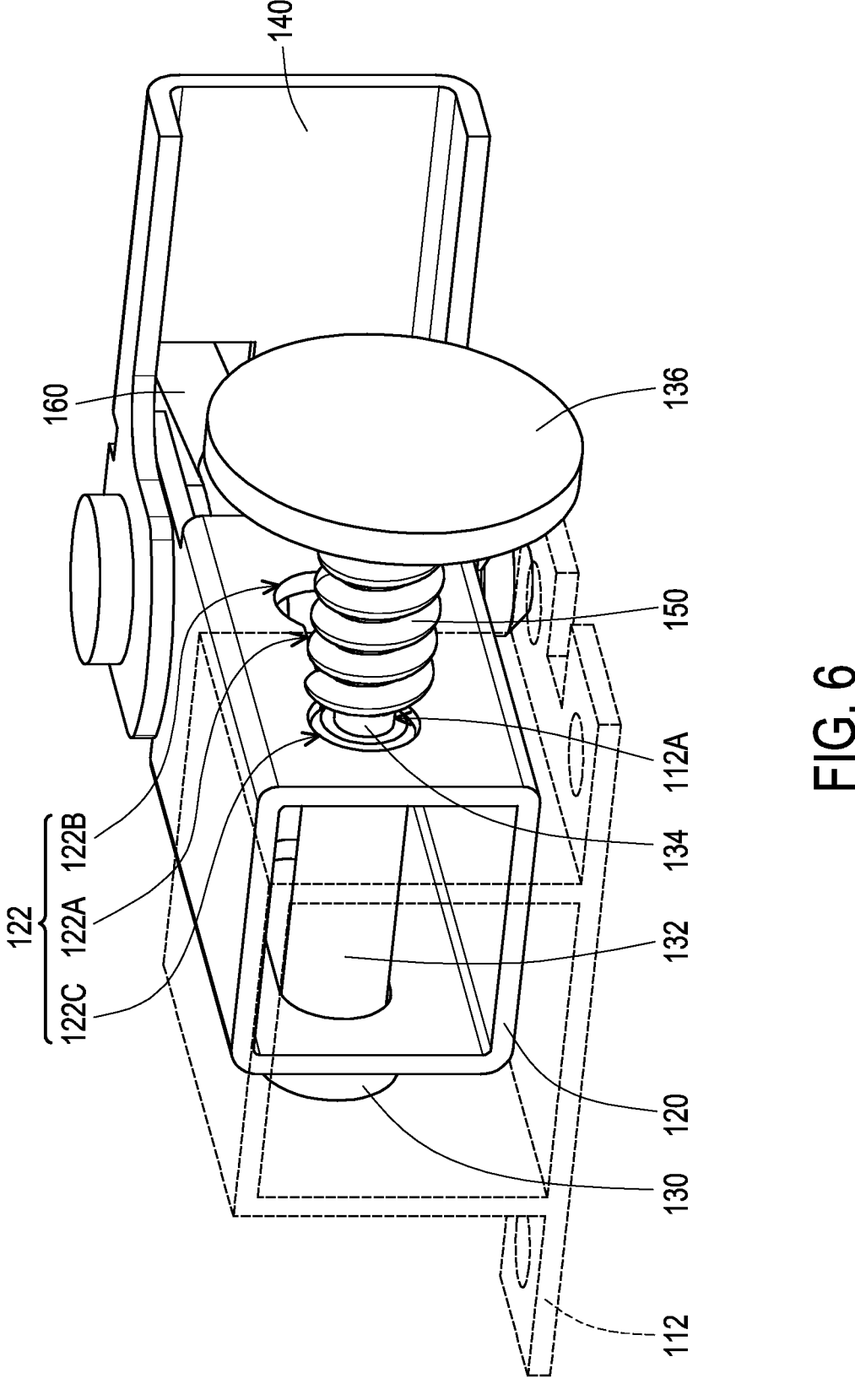
FIG. 6 is a partial schematic diagram of the sliding part of the head mounted display device of FIG. 1 locked in the pulled-out position.

FIG. 6 is a partial schematic diagram of the sliding part of the head mounted display device of FIG. 1 locked in the pulled-out position. Referring to FIG. 6, the sliding part 120 has slid from the retracted position to the pulled-out position relative to the connecting base 112. Moreover, the locking part 130 slides along its length direction so that the first segment 132 enters the second end 122C of the slot 122, and the second segment 134 exits the slot 122. At this time, the sliding part 120 cannot slide relative to the connecting base 112. In the embodiment, the head mounted display device 100 further includes two elastic parts 150 (only one is shown in the figure). Each of the elastic parts 150 is respectively set on the second segment 134 of the corresponding locking part 130 and located between the corresponding connecting base 112 and the corresponding pressing part 136. An elastic restoring force of the elastic parts 150 causes the pressing parts 136 to have a tendency to move away from the holes 112A. That is, when the user presses the pressing part 136 in the state of FIG. 4 to push the locking part 130 to become the state of FIG. 5. And after sliding the sliding part 120 to the pulled-out position to become a state as shown in FIG. 6, as long as the user no longer presses the pressing part 136, the elastic restoring force of the elastic parts 150 will be exerted on the pressing part 136 to make it slide in the direction away from the hole 112A. Therefore, the first segment 132 of the locking part 130 will automatically enter the second end 122C of the slot 122 due to the elastic restoring force of the elastic parts 150. At this time, the locking part 130 locks the sliding part 120 in the pulled-out position, and the first segment 132 of the locking part 130 is located at the second end 122C of the slot 122.

Referring to FIG. 1, FIG. 3 and FIG. 4, the head mounted display device 100 of the embodiment further includes two elastic parts 160 (only one is shown in the figure), which are respectively arranged at pivot joints of the corresponding bracket 140 and the corresponding sliding part 120. The elastic parts 160 allow the two brackets to have a tendency to rotate toward the direction of clamping the user's head, thereby providing appropriate clamping force. In addition, in the embodiment, sliding directions of the two sliding parts 120 are, for example, parallel to each other. Besides, in the embodiment, the sliding parts 120 and the connecting bases 112 are, for example, rectangular tubes.

In summary, in the head mounted display device of the application, the distance between the two brackets is adjusted by sliding the sliding parts and the connecting bases, so the distance between the two brackets can be appropriately adjusted according to the user's head size. For the users with smaller heads, there is no need to worry about the head mounted display device being easily loosened. For the users with larger heads, there is no need to worry about excessive clamping force causing discomfort.

What is claimed is:

1. A head mounted display device, comprising:

a host, has two connecting bases located on opposite sides of the host;

two sliding parts, respectively slidably connected to the corresponding connecting base;

two locking parts, respectively used to lock the corresponding sliding part in a retracted position or a pulled-out position relative to the corresponding connecting base; and two brackets, respectively pivotally connected to one end of the corresponding sliding part away from the host, wherein each of the connecting bases has a hole, each of the locking parts has a first segment and a second segment connected to each other, a rod diameter of the first segment of each of the locking parts is larger than a rod diameter of the second segment, each of the sliding parts has a slot, each of the slots has a connecting section and a first end and a second end located at both ends of the connecting section, a hole diameter of each of the first ends and a hole diameter of each of the second ends are greater than or equal to the rod diameter of each of the first segments, a width of each of the connecting sections is less than the rod diameter of each of the first segments and greater than or equal to the rod diameter of each of the second segments, a hole diameter of each of the holes is smaller than the rod diameter of each of the first segments and greater than or equal to the rod diameter of each of the second segments, each of the second segments passes through the corresponding hole, when each of the locking parts locks the corresponding sliding part in the retracted position, the first segment is located at the first end, and when each of the locking parts locks the corresponding sliding part in the pulled-out position, the first segment is located at the second end.

2. The head mounted display device according to claim 1, wherein each of the locking parts further has a pressing part, located at one end of the second segment away from the first segment, and the pressing part and the first segment are respectively located at both sides of the corresponding hole.

3. The head mounted display device according to claim 2, further comprises two elastic parts, respectively set on the corresponding second segment and located between the corresponding connecting base and the corresponding pressing part, wherein an elastic restoring force of the elastic parts causes the pressing parts to have a tendency to move away from the holes.

4. The head mounted display device according to claim 1, further comprises two elastic parts, respectively arranged at pivot joints of the corresponding bracket and the corresponding sliding part.

5. The head mounted display device according to claim 1, wherein sliding directions of the sliding parts are parallel to each other.

6. The head mounted display device according to claim 1, wherein the sliding parts and the connecting bases are rectangular tubes.

* * * * *